(No Model.)　　　　　　　　　　　　　　　　　2 Sheets—Sheet 1.
J. H. JONES.
SEEDING MACHINE.
No. 374,539.　　　　　　　　　　　Patented Dec. 6, 1887.
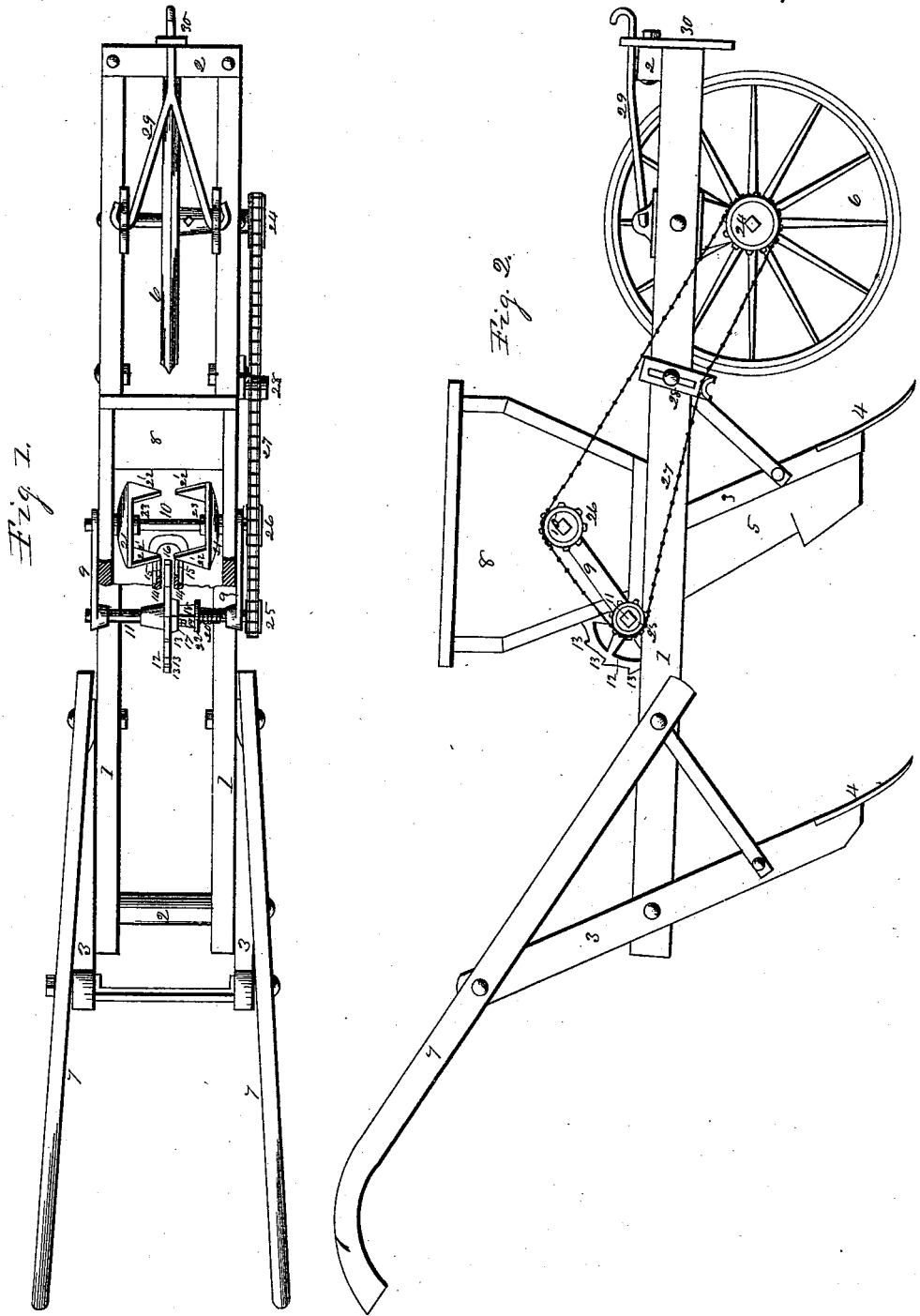
Witnesses,
Evans Blake
A. O. Behel
Inventor
James Herra Jones,
Per Jacob Behel.
Atty.

(No Model.) 2 Sheets—Sheet 2.
J. H. JONES.
SEEDING MACHINE.
No. 374,539. Patented Dec. 6, 1887.
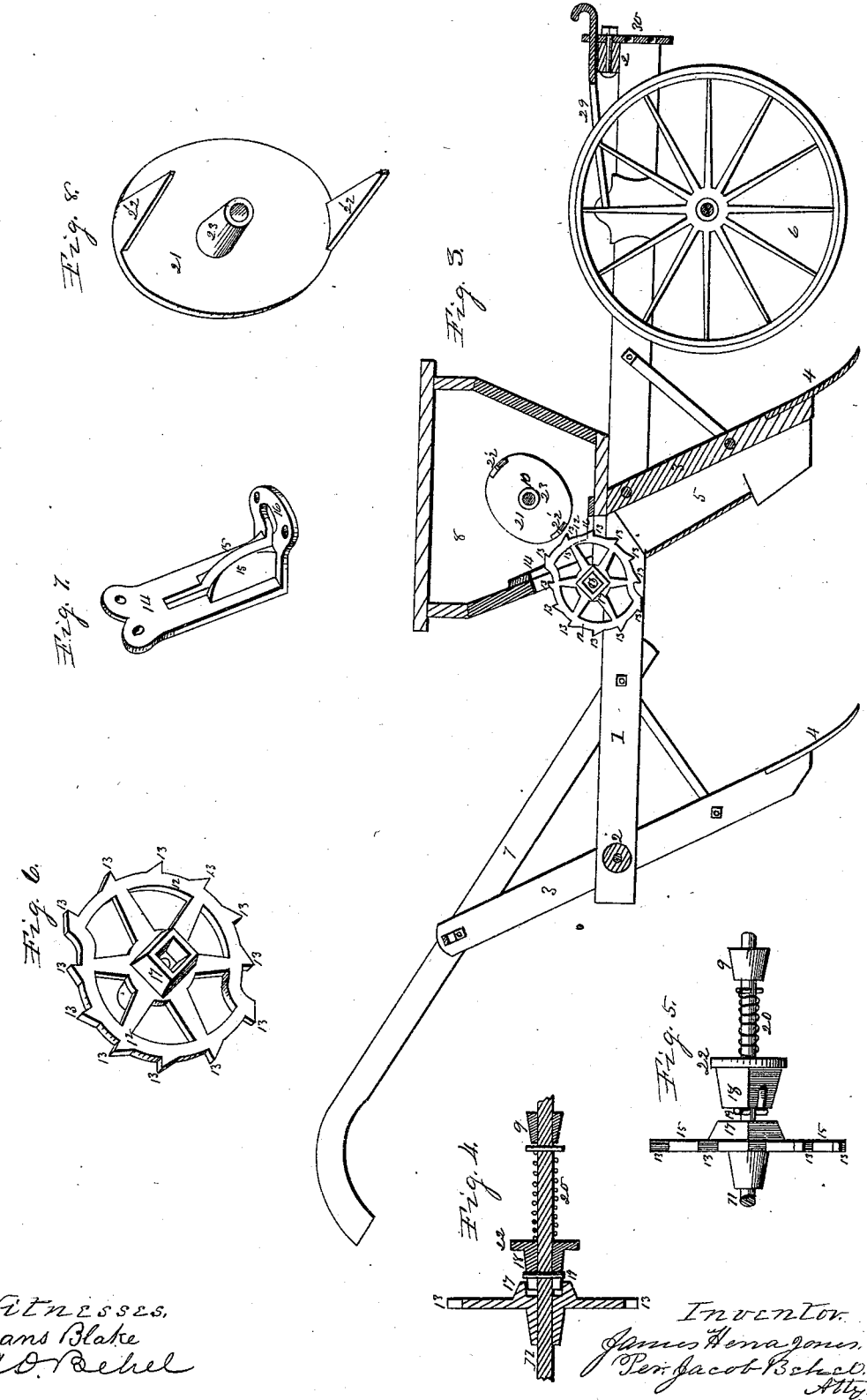
Witnesses,
Evans Blake
A. O. Behel
Inventor.
James Hena Jones
Per Jacob Behel
Atty.

UNITED STATES PATENT OFFICE.

JAMES HERVA JONES, OF ROCKFORD, ILLINOIS, ASSIGNOR TO EMERSON, TALCOTT & COMPANY, OF SAME PLACE.

SEEDING-MACHINE.

SPECIFICATION forming part of Letters Patent No. 374,539, dated December 6, 1887.

Application filed July 7, 1887. Serial No. 243,647. (No model.)

*To all whom it may concern:*

Be it known that I, JAMES HERVA JONES, a citizen of the United States, residing in the city of Rockford, in the county of Winnebago and State of Illinois, have invented certain new and useful Improvements in Seeding-Machines, of which the following is a specification.

This invention relates to a class of seed-planters designed to plant seed in drills, but is more especially designed as a cotton-seed planter to deliver the fibrous seeds in drills. Its object is a uniform distribution of the seed in drills, and to this end I have designed and constructed the machine represented in the accompanying drawings, in which—

Figure 1 is a plan view of a machine embodying my invention, and in which portions of the seed-box are broken away to show the parts more clearly. Fig. 2 is a side elevation. Fig. 3 is a lengthwise vertical central section. Fig. 4 is a lengthwise central section of the shaft-support and clutch-connection of the seed-wheel. Fig. 5 represents the clutch-head disengaged from the seed-distributing wheel. Fig. 6 is an isometrical representation of the seed-wheel. Fig. 7 is an isometrical representation of the slotted bearing-plate to the seed-wheel, and Fig. 8 is an isometrical representation of one of the seed-agitators.

The several parts represented in the figures in the drawings, consisting of the shovel-beams 1, end beams 2, shovel-standards 3, shovels 4, seed-spout 5, driving-wheel 6, and handles framed and joined to each other in a secure manner, are in every particular substantially the same as like parts heretofore employed in like machines for like purposes.

A seed-box, 8, of ordinary construction, is fixed in place centrally on the shovel-beams, and to the opposite sides of the seed-box are fixed bearing-bars 9, having their ends bored to receive a shaft, 10, extending centrally through the seed-box to support agitators within the box, and also a seed-wheel shaft 11 at the rear end of the seed-box.

A seed-distributing wheel, having its rim portion made in like semicircular segments, 12, is placed on opposite sides eccentric to the axis of the wheel in such a manner that the periphery of each segment shall be inclined in the same direction to radial lines cutting the segments at opposite points, and so that the semi-diameters of the wheel on all opposite radial lines shall be substantially equal. Like saw-tooth projections, 13, are formed on the periphery of the seed-wheel at substantially equal intervals throughout the whole extent.

The hub of the seed-distributing wheel is bored to receive its shaft-support 11 freely, on which it is centrally mounted in such position that its periphery shall extend through a slotted opening formed in the rear under portion of the box, and through a slotted metallic bearing, 14, fixed in the inner lower rear angle of the seed-box.

The slotted metallic bearing 14 is provided on its inner face with segment-formed cheeks 15 on each side of the inward projecting portion of the seed-distributing wheel, and serves to hold the wheel in position on its shaft-support to revolve in the slotted opening and prevent the seed entering the open spaces within the rim of the seed-wheel.

An enlarged opening, 16, is formed in the horizontal foot portion of the bearing-plate, through which the seed is carried by the teeth of the seed distributing wheel in its rotations, and is delivered into the seed-spout 5, through which it descends, and is deposited in the furrow formed by the shovel on the lower end of the spout.

One end, 17, of the hub of the seed-distributing wheel is made in angular socket form to receive a clutch-head. A clutch-head, 18, of a conformation to freely enter the socket-formed end of the hub of the seed-distributing wheel, is bored to receive the shaft-support to the seed-wheel, on which it is mounted to slide endwise. One end of the clutch-head is slotted lengthwise to receive a pin, 19, passed through the shaft to cause it to revolve therewith.

A spiral spring, 20, surrounding the shaft between the clutch-head, and a pin, 21, passed through the shaft, operates to hold the clutch-head within the socket end of the seed-distributing wheel-hub, to cause it to revolve with the shaft.

A thumb-flange, 22, projecting from the end of the clutch-head opposite its slotted end, provides the means by which an attendant can withdraw the clutch-head from its socket-connection with the seed-distributing wheel and its slotted end off of the pin and turn it to a position on the shaft to cause the end of its non-slotted sides to engage the pin, as shown in Fig. 5, and hold it disengaged from the seed-distributing wheel and stop its rotation.

Seed-agitators consisting of a concavo-convex disk-head, 21, elliptical in plan, with like tapering or pointed agitator-teeth 22 projecting from the peripheral edge of its concave side at opposite points of its greatest diameter and extending parallel with its axis and their opposite edges, are of equal angles, inclined or oblique, to the plane of its axis, and a hub, 23, bored to receive an axial support, are mounted on their shaft-support 10, within the seed-box, at opposite sides thereof, with their teeth projecting inward and separated on quadrants of the circle.

Sprocket-wheels 24, 25, and 26 are fixed on the projecting ends of their respective shafts, and a chain belt, 27, is supported on the several sprocket-wheels to impart motion from the driving-wheel 6 to the seed-distributing wheel and to the agitator within the seed-box.

A belt-tightener, 28, is made adjustable in its connection with the shovel-beam to take up the slack of the chain belt to give it the required tension to transmit motion to the parts with which it connects.

In this construction and arrangement of the seed-agitators the convex surfaces of the disk-heads are toward and near to the inner faces of the side walls of the seed-box, which, in connection with their elliptical conformation, in their rotations tend to carry the seed from their axial centers and prevent packing or banking the seed between the disk-heads and the seed-box. In the rotation of the agitators the inclined edges of the agitator-teeth 22 operate to carry the seed toward the center of the seed-box, to be carried by the teeth of the seed-distributing wheel in its rotations through the enlarged seed-opening 16 and deliver it into the seed-spout.

When a concentric seed-wheel is employed in this class of seeding-machines, its tendency is to form a channel through the seed contained in the seed-box, the walls of which are beyond the track of the teeth in the wheel, and hence an unequal distribution of the seed. This difficulty is obviated by the employment of my improved eccentric seed-distributing wheel, in which each succeeding tooth in each semi-series travels in a circle of greater diameter than the tooth preceding it, and this action, in connection with my improved agitator, insures a more nearly uniform distribution of the seed.

A branching draft-bar, 29, is hinge-jointed at the rear end of its branching arms to the shovel-beams, and its forward end portion extends through an adjusting-bar, 30, made vertically adjustable in its connection with the forward end beam of the shovel-frame by means of a screw bolt or pin to enter any of a series of holes formed in the bar to connect it with the frame to vary the running depth of the machine.

The forward end of the draft-bar is made in hook form to receive the draft apparatus employed to connect the team with the planter.

I claim as my invention—

1. In a seed-planter, an eccentric seed-distributing wheel, said wheel having teeth projecting from its eccentric peripheral edge, substantially as and for the purpose set forth.

2. The combination of a seed-box provided with a slot in one of its sides, an eccentric seed-distributing wheel, with toothed periphery mounted to revolve in the slotted opening in the seed-box, and a slotted bearing-plate to the seed-distributing wheel within the seed-box, said bearing-plate made with segment-bearing jaws on opposite sides of the seed-distributing wheel, and an enlarged opening, through which the seed is discharged, substantially as and for the purpose set forth.

3. The combination of a seed-distributing wheel mounted on its shaft-support to rotate in the slotted opening in the seed-box, a clutch-head to enter the socket-hub of the seed-wheel, a pin to receive the slotted end of the clutch-head, and a spring to hold the clutch-head in clutch-connection with the seed-wheel and permit its withdrawal therefrom, substantially as and for the purpose set forth.

4. In a seeding-machine, agitators consisting of concavo-convex elliptical disk-head, having like tapering or pointed agitator-teeth projecting from the peripheral edge of its concave side at opposite points of its greatest diameter, and their opposite edges of opposite angles equally inclined to the plane of its axis, substantially as and for the purpose set forth.

5. The combination of an eccentric seed-distributing wheel with toothed periphery mounted to revolve in contact with the seed contained within the seed-box, and seed-agitators, substantially as shown and described, mounted to rotate within the seed-box, as and for the purpose set forth.

6. The combination of a seed-box, bearing-plates fixed to the opposite sides of the seed-box, a shaft-support to the agitators mounted to revolve in the bearing-plates, and a shaft-support to the seed-distributing wheel mounted to revolve in the said bearing-plates, substantially as and for the purpose set forth.

JAMES HERVA JONES.

Witnesses:
H. D. EASTMAN,
A. O. BEHEL.